(12) United States Patent
Eifert

(10) Patent No.: US 10,247,104 B2
(45) Date of Patent: Apr. 2, 2019

(54) OXYGEN ENHANCED PNEUMATIC STARTING

(71) Applicant: Rolls-Royce North American Technologies, Inc., Indianapolis, IN (US)

(72) Inventor: Andrew J. Eifert, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 371 days.

(21) Appl. No.: 15/135,617

(22) Filed: Apr. 22, 2016

(65) Prior Publication Data
US 2016/0312710 A1 Oct. 27, 2016

Related U.S. Application Data

(60) Provisional application No. 62/151,544, filed on Apr. 23, 2015.

(51) Int. Cl.
| F02C 7/27 | (2006.01) |
| F23L 7/00 | (2006.01) |
| F23R 3/04 | (2006.01) |
| F23R 3/28 | (2006.01) |

(52) U.S. Cl.
CPC ............... *F02C 7/27* (2013.01); *F23L 7/007* (2013.01); *F23R 3/04* (2013.01); *F23R 3/286* (2013.01); *F05D 2260/85* (2013.01); *Y02E 20/344* (2013.01)

(58) Field of Classification Search
CPC .......... F02C 7/27; F05D 2260/85; F23R 3/04; F23L 7/007
See application file for complete search history.

(56) References Cited

U.S. PATENT DOCUMENTS

| 3,085,396 | A | * | 4/1963 | Kent | F02C 7/27 |
| | | | | | 415/116 |
| 4,161,102 | A | | 7/1979 | Jasas et al. | |
| 4,777,793 | A | | 10/1988 | Weigand et al. | |
| 4,899,536 | A | | 2/1990 | Vershure | |
| 5,020,317 | A | | 6/1991 | McArthur | |
| 5,131,225 | A | | 7/1992 | Roettger | |
| 5,214,911 | A | | 6/1993 | Shekleton | |
| 5,343,690 | A | * | 9/1994 | Shekleton | F01D 5/284 |
| | | | | | 60/778 |
| 6,644,033 | B2 | * | 11/2003 | Daggett | F02C 7/27 |
| | | | | | 60/787 |

(Continued)

*Primary Examiner* — Carlos A Rivera
(74) *Attorney, Agent, or Firm* — Fishman Stewart PLLC

(57) ABSTRACT

A pneumatic starter system for a turbine engine. The pneumatic starter system includes a pneumatic starter and a compressed gas storage unit. The pneumatic starter is configured to cause at least one turbine of the turbine engine to rotate. The compressed gas storage unit is configured to store oxygen rich gas and expel the oxygen rich gas to power the pneumatic starting system to cause the at least one turbine to rotate. The pneumatic starter system also includes a first exhaust path configured to direct at least a first portion of the oxygen rich gas exhausted from the pneumatic starter to a turbine combustion zone of the turbine engine to create an oxygen rich fuel mixture.

17 Claims, 3 Drawing Sheets

(56) References Cited

U.S. PATENT DOCUMENTS

| | | | | |
|---|---|---|---|---|
| 6,941,760 B1 * | 9/2005 | Jones | ............... | F02C 7/268 60/727 |
| 7,882,695 B2 * | 2/2011 | Roberge | ............ | F02C 3/073 60/204 |
| 8,783,009 B2 | 7/2014 | Khosid et al. | | |

* cited by examiner

OXYGEN ENHANCED PNEUMATIC STARTING

CROSS-REFERENCE TO RELATED APPLICATIONS

This application claims priority to U.S. Provisional Patent Application No. 62/151,544 filed on Apr. 23, 2015, the contents of which are hereby incorporated by reference in its entirety.

FIELD OF TECHNOLOGY

The present disclosure relates to turbine engines and more particularly, but not exclusively, to a method, system, and/or apparatus to start or restart turbine engines. Further, this present disclosure relates to enhancement of turbine engine starting or restarting systems. Although the improvements are applicable to starting or restarting systems for turbine engines used for propulsive power in air, the improvements are also applicable to turbine engines employed in marine, underwater, and land applications.

BACKGROUND

It has become increasingly desirable to improve the overall system, design, and operation of engine starting or restarting systems for turbines engines. Operation of turbine engines engaged in an engine starting or restarting procedure may suffer if the oxygen content in the combustion zone of the turbine engine is depleted. If oxygen content present in the combustion zone is not at a sufficient level, combustion of the fuel/air mixture in the combustion zone may be inefficient or simply fail.

Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Figure 1:
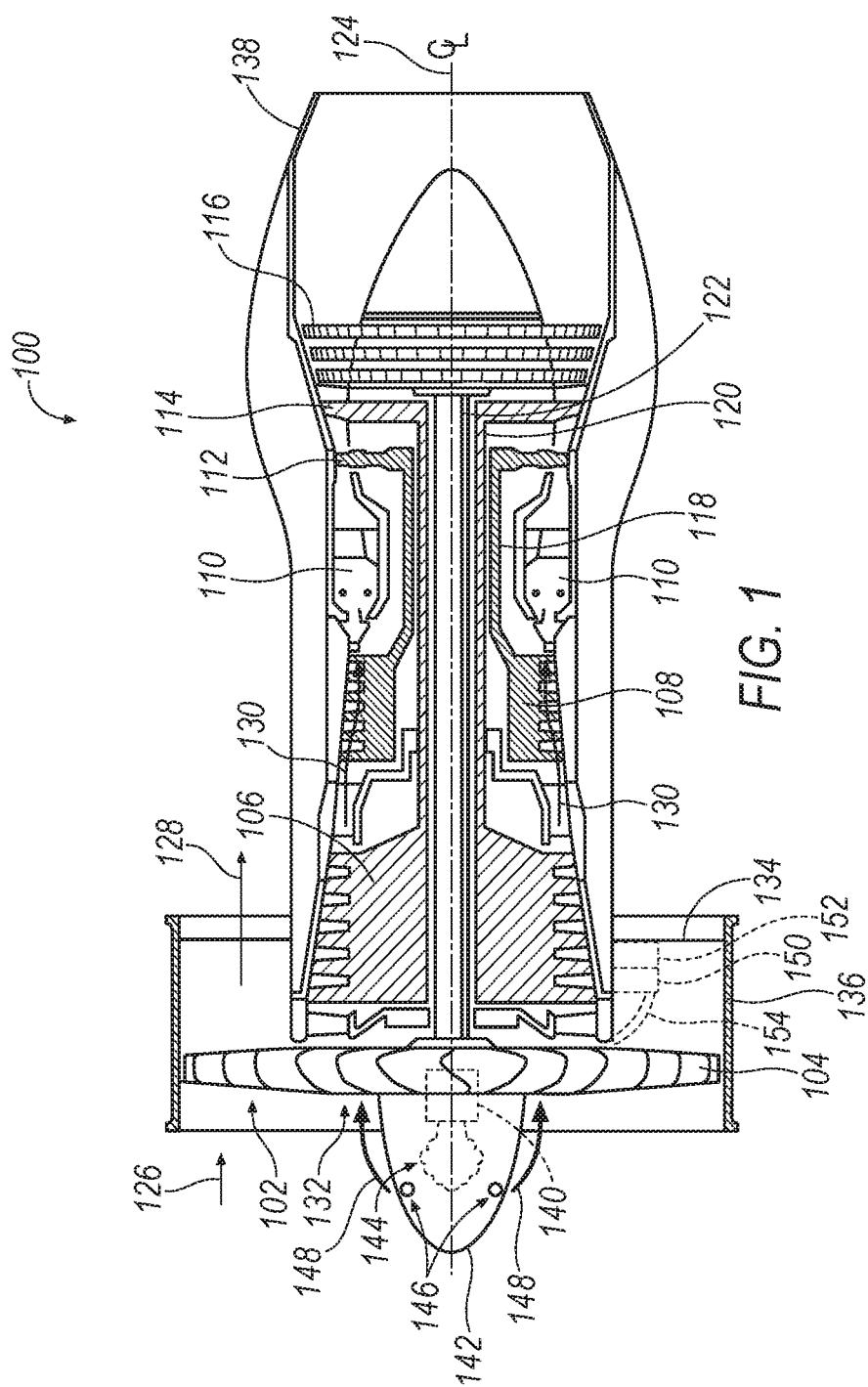
FIG. 1 illustrates a schematic view of a gas turbine engine employing exemplary improvements discussed herein.

FIG. 1 illustrates a turbine engine 100, which includes a fan 102, a low pressure compressor 104 ("LP compressor"), intermediate pressure compressor 106 ("IP compressor"), a high pressure compressor 108 ("HP compressor"), a combustor 110, a high pressure turbine 112 ("HP turbine"), an intermediate pressure turbine 114 ("IP turbine") and low pressure turbine 116 ("LP turbine"). The HP compressor 108, the IP compressor 106 and the LP compressor 104 are connected to a respective one of an HP shaft 118, an IP shaft 120 and an LP shaft 122, which in turn are connected to a respective one of the HP turbine 112, the IP turbine 114 and the LP turbine 116. The shafts extend axially and are parallel to a longitudinal center-line axis 124. While FIG. 1 illustrates a three-shaft engine, it will be appreciated that other embodiments can have configurations including more or less than three shafts.

During general operation of the engine 100, ambient air 126 enters the fan 102 and proceeds as a bypass airflow 128 and a primary air stream 130. The primary air stream 130 is created as ambient air 126 is directed across a fan rotor 132 into an annular duct 134 (in part circumscribed by a fan case 136) and into the combustor 110. The bypass airflow 128 provides a fraction of engine thrust while the primary air stream 130 is directed to the combustor 110 (i.e., turbine combustion zone). The primary air stream 130 mixes with fuel in combustor 110 where ignition occurs. As a result of the ignition, expanding gas passes over the turbines 112, 114, 116 and is exhausted through a nozzle 138 generating thrust.

Coupled, via gearing (not shown), to at least one of the LP shaft 122, IP shaft 120, and/or HP shaft 118 is a pneumatic starter system 140, which is at least partially enclosed in a nosecone 142 of the turbine engine 100. The pneumatic starter system 140 is configured to provide starting power to the turbine engine 100. According to an embodiment, pneumatic starter system 140 causes the LP shaft 122 to rotate, thus causing the fan 102 and the LP turbine 116 to rotate. As such, the primary air stream 130 is conveyed to the combustor 110, where ignition occurs to initiate starting (restarting) of the turbine engine 100. Alternatively, the pneumatic starter system 140 may be coupled to another shaft (e.g., HP shaft 118) to cause the respective shaft and turbine to rotate and thus convey the primary air stream 130 to the combustor 110.

The pneumatic starter system 140 is driven by substantially pure oxygen gas or at least oxygen rich gas (not shown). It is contemplated that if substantially pure oxygen gas is not employed to drive the pneumatic starter system 140, the alternative oxygen rich gas employed may include at least twenty-five percent (25%) oxygen. Regardless of whether substantially pure oxygen or oxygen rich gas is used, oxygen rich exhaust 144 from the pneumatic starter system 140 passes into the nosecone 142. During operation, a plurality of voids 146 or holes in the nosecone 142 allows the oxygen rich exhaust 144 to be drawn from the nosecone 142. As such, oxygen rich exhaust 144 follows two exhaust paths 148 leaving the nosecone 142 via the holes 146. These exhaust paths 148 mix with the primary air stream 130 as they are conveyed to the combustor 110. The resulting fuel/air mixture present in the combustor 110 therefore has increased oxygen content during starting (restarting). As such, ignition efficiency in the combustor 110 during starting or restarting procedures is enhanced. It is noted that though two holes 146 are illustrated in FIG. 1, embodiments may employ as little as one hole or more than two holes. Further, the quantity of exhaust paths may correspond with the quantity of holes employed.

As described above, oxygen rich exhaust 144 from the pneumatic starter system 140 is provided to the combustion zone (i.e., combustor 110) during a starting or restarting procedure. Further, as described in an embodiment above, the oxygen gas powered pneumatic starter system 140 is at least partially housed in the nosecone 142. According to other embodiments, however, the pneumatic starting system may be mounted or housed elsewhere. For example, instead of housing the oxygen gas powered pneumatic starting system in the nosecone 142, a pneumatic starter system 150 (shown in phantom) may be mounted in the annular duct 134. According to such an embodiment, the pneumatic starting system 150 may be coupled to an auxiliary gearbox 152 (shown in phantom), which drives at least one of the shafts 118-122 during a starting or restarting procedure. It is contemplated that at least one duct 154 may convey the oxygen rich exhaust of the pneumatic starter system 150 along an exhaust path to the fan rotor 132. With the aid of the duct 154, the exhaust path for the oxygen rich exhaust is drawn into the primary air stream 130 and into the combustion zone 110 during starting and/or restarting procedures. Since in such an embodiment the pneumatic starter system 150 is not housed in the nosecone 142, the holes 146 in the nosecone 146 need not be present.

Figure 2:
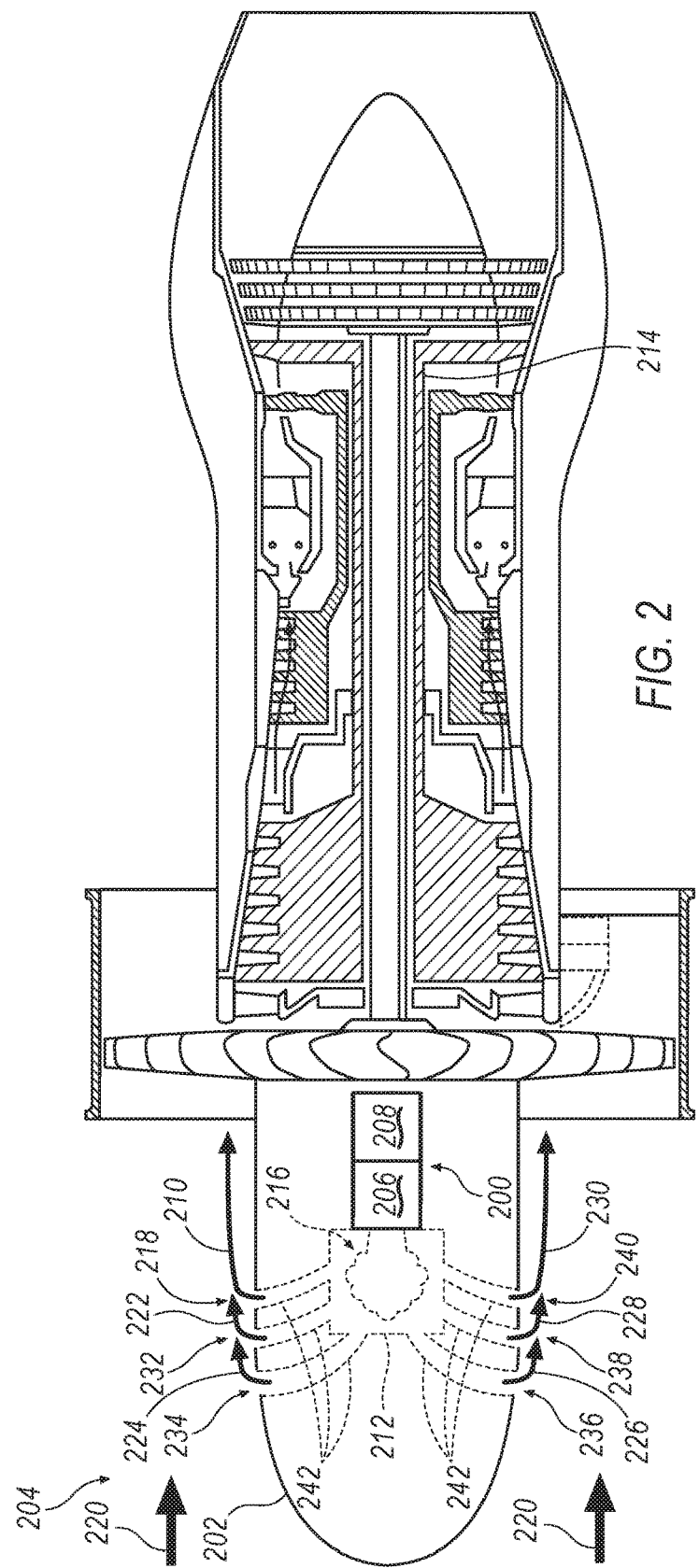
FIG. 2 illustrates a schematic view of exemplary pneumatic starting systems for a gas turbine engine.

Turning now to FIG. 2, a pneumatic starting system 200 is shown according to an embodiment. The pneumatic starting system or apparatus 200 is shown at least partially housed in a nosecone 202 of turbine engine 204. The pneumatic starting system 200 includes a pneumatic starter motor 206 (i.e., a pneumatic starter), a compressed gas storage tank 208, and a first exhaust path 210. The compressed gas storage tank 208 or unit provides either substantially pure oxygen gas or an oxygen rich gas to the pneumatic starter motor 206. The expansion of the oxygen rich gas powers the pneumatic starter motor 206, thus at least initiating the starting (or restarting) of the turbine engine 204. As discussed above with respect to FIG. 1, the starting procedure causes at least one turbine or fan (e.g., fan 102, turbine 112, turbine 114, and/or turbine 116 of FIG. 1) to begin rotation. Accordingly, as shown in FIG. 2, the exhaust path 210 mixes with a primary air stream 212 as they proceed into a combustion zone 214 of the turbine engine 204.

The pneumatic starter motor 206 exhausts oxygen rich gas (a.k.a., oxygen rich exhaust 216) into the nosecone 202. Due to a first void 218 or hole in the nosecone 202, during a starting procedure the oxygen rich exhaust 216 is drawn from the nosecone 202 along the first exhaust path 210 out the first hole 218 and into the primary air stream 212, which is conveyed to the combustion zone 214. As will be appreciated, the gas turbine engine 204 is powered when fuel (not shown) provided to the combustion zone 214 is ignited. The pneumatic starter motor 206 provides the oxygen rich exhaust 216 along the first exhaust path 210 to combustion zone 214, thus creating a fuel mixture that includes an oxygen rich gas for increasing the efficiency of fuel ignition.

Accordingly, the fuel mixture in the combustion zone 214 that includes oxygen rich gas increases the efficiencies of starting or restarting procedures. For example, during airplane or missile flight, the oxygen content of incoming ambient air 220 can be depleted since oxygen content in the air generally decreases as altitude increases. As such, during an in-flight restarting procedure (e.g., starting an engine that has stalled), it may be difficult to ignite the fuel in the combustion zone 214 if the primary gas stream is oxygen depleted. However, because the first exhaust path 210 provides oxygen rich exhaust 216 to the primary air stream 212 and therefore to the combustion zone 214, the chances of fuel ignition are increased since the oxygen content in the fuel/air mixture has been increased. In addition to having a positive impact on inflight restarting procedures, an oxygen rich fuel mixture in the combustion zone 214 also has a positive impact during on-ground starting procedures.

It is contemplated that one or more additional exhaust paths from the pneumatic starter motor 206 may be provided to the combustion zone 214. For example, as illustrated in FIG. 2, a second, third, fourth, fifth, and sixth exhaust path 222, 224, 226, 228, 230 may be employed, where each exhaust path 222-230 provides a portion of the oxygen rich exhaust 216 from the pneumatic starter motor 206 to the combustion zone 214. As shown, the second, third, fourth, fifth, and sixth exhaust paths 222-230 respectively pass through a second, third, fourth, fifth, and sixth void 232, 234, 236, 238, 240 in the nosecone 202.

Though embodiments depicted in FIG. 2 illustrate between one and six exhaust paths 210, 222-230, embodiments may include more or less exhaust paths than those shown (i.e., exhaust paths 210, 222-230). Further, the manner in which the exhaust paths 210, 222-230 pass through the nosecone 202 as shown in FIG. 2 is merely exemplary. That is, the voids or holes 218, 232-240 may be positioned in other areas of the nosecone 202 than those shown.

It is contemplated that the exhaust paths 210, 222-230 may be directed through the nosecone 202 via a plurality of conduit 242 (each shown in phantom) coupled to the pneumatic starter motor 206. Accordingly, portions of the oxygen rich exhaust 216 expelled from the pneumatic starter motor 206 respectively pass through each conduit 242. If conduit is employed, the number of conduit employed may depend on the number of exhaust paths or nosecone holes that are employed.

Figure 3:
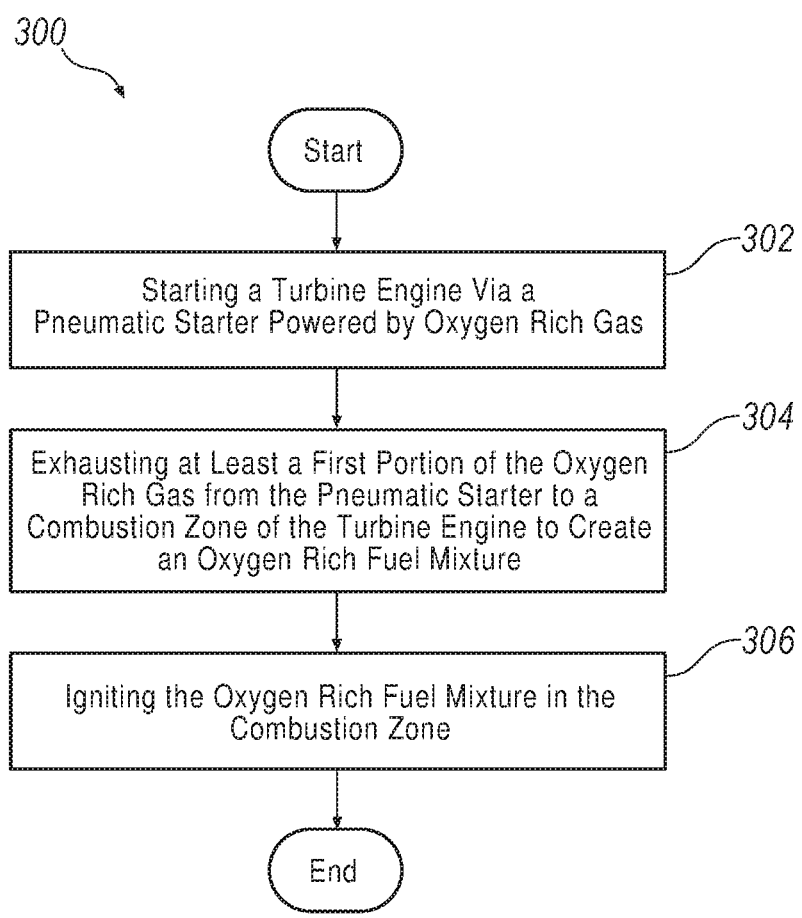
FIG. 3 is a flowchart representing a technique for starting or restarting a turbine engine.

With reference now to FIG. 3, a flowchart depicts a technique 300 or method for starting a turbine engine. Technique 300 begins at block 302 by starting a turbine engine via a pneumatic starter powered by oxygen rich gas. The oxygen rich gas may be substantially pure oxygen gas or other gas having increased oxygen content. As starting of the gas turbine engine continues, process control proceeds to block 304, where technique 300 includes exhausting at least a first portion of the oxygen rich gas from the pneumatic starter to a combustion zone of the turbine engine to create an oxygen rich fuel mixture. Since the pneumatic starter may be housed either outside the nosecone of the turbine engine or at least partially inside the nosecone, the oxygen rich gas may or may not be exhausted through the nosecone. Regardless of the position of the exhaust path, process control then proceeds to block 306, where technique 300 includes igniting the oxygen rich fuel mixture in the combustion zone. Accordingly, technique 300 provides a method for increasing the efficiency of turbine engine starting and/or restarting procedures.

It will be appreciated that the aforementioned method and devices may be modified to have some components and steps removed, or may have additional components and steps added, all of which are deemed to be within the spirit of the present disclosure. Even though the present disclosure has been described in detail with reference to specific examples, it will be appreciated that the various modifications and changes can be made to these examples without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the to the contrary. Likewise, the use of the words "first", "second", etc. may be interchangeable.

What is claimed is:

1. A turbine engine, comprising:
   a pneumatic starter configured to provide starting power to the turbine engine, wherein the pneumatic starter comprises a compressed gas storage tank configured to provide oxygen rich gas to power the pneumatic starter;
   a nosecone configured to at least partially house the pneumatic starter;
   a combustion zone where fuel for the turbine engine combusts; and
   a first exhaust path from the pneumatic starter, wherein the first exhaust path directs at least a first portion of the oxygen rich gas exhausted from the pneumatic starter to the combustion zone to create an oxygen rich fuel mixture in the combustion zone.

2. The turbine engine of claim 1, wherein the oxygen rich gas is one of substantially pure oxygen gas and oxygen rich gas composed of at least twenty-five percent oxygen.

3. The turbine engine of claim 2, wherein the pneumatic starter provides starting power to the turbine engine by causing rotation of at least one turbine of the turbine engine.

4. The turbine engine of claim 1, wherein the nosecone comprises a first void therethrough, and wherein the first exhaust path passes out the nosecone through the first void.

5. The turbine engine of claim 4, wherein the first portion of the oxygen rich gas exhausted from the pneumatic starter is directed along the first exhaust path to mix with a primary air stream that enters the combustion zone.

6. The turbine engine of claim 4 further comprising:
   a second exhaust path from the pneumatic starter motor to the combustion zone, wherein the second exhaust path directs at least a second portion of the oxygen rich gas exhausted from the pneumatic starter to the combustion zone; and
   a second void in the nosecone, wherein the second exhaust path passes through the second void to allow the second portion of the oxygen rich gas exhausted from the pneumatic starter to pass therethrough before entering the combustion zone.

7. A pneumatic starter system for a turbine engine, the pneumatic starter system comprising:
   a pneumatic starter configured to cause at least one turbine of the turbine engine to rotate;
   a nosecone configured to at least partially house the pneumatic starter;
   a compressed gas storage unit configured to:
      store oxygen rich gas; and
      expel the oxygen rich gas to power the pneumatic starter system to cause the at least one turbine to rotate;
   wherein the pneumatic starter system further comprises a first exhaust path configured to direct at least a first portion of the oxygen rich gas exhausted from the pneumatic starter to a turbine combustion zone of the turbine engine to create an oxygen rich fuel mixture.

8. The pneumatic starter system of claim 7, wherein at least the first portion of the oxygen rich gas exhausted from the pneumatic starter is one of one of substantially pure oxygen gas and oxygen rich gas composed of at least twenty-five percent oxygen.

9. The pneumatic starter system of claim 8, wherein the first exhaust path passes through the nosecone of the turbine engine such that the at least first portion of the oxygen rich gas exhausted from the pneumatic starter exits the nosecone prior to entering the turbine combustion zone.

10. The pneumatic starter system of claim 9, further comprising a second exhaust path configured to direct at least a second portion of the oxygen rich gas exhausted from the pneumatic starter to the turbine combustion zone.

11. The pneumatic starter system of claim 10, wherein the turbine engine provides power to one of an airplane and a missile.

12. A method comprising:
   starting a gas turbine engine via a pneumatic starter at least partially housed in a nosecone of the gas turbine engine and powered by oxygen rich gas;
   exhausting at least a first portion of the oxygen rich gas from the pneumatic starter to a combustion zone of the gas turbine engine to create an oxygen rich fuel mixture; and
   igniting the oxygen rich fuel mixture in the combustion zone;
   wherein the nosecone is located along an axis of the gas turbine engine and at an air intake of the gas turbine engine, and has a cone shape oriented with the tip to the base in the direction of the air intake.

13. The method of claim 12, wherein the oxygen rich gas is one of (i) substantially pure oxygen gas and (ii) oxygen rich gas having at least twenty-five percent oxygen.

14. The method of claim 13, wherein combustion of the oxygen rich fuel mixture in the combustion zone causes a turbine of the turbine engine to continue to rotate.

15. The method of claim 13, wherein the exhausting at least the first portion of the oxygen rich gas from the pneumatic starter to the combustion zone comprises exhausting at least the first portion of the oxygen rich gas from the pneumatic starter housed outside the nosecone.

16. The method of claim 13, wherein the turbine engine is coupled to one of an airplane and a missile, and wherein starting the turbine engine via the pneumatic starter occurs while the one of the airplane and the missile is in flight.

17. The method of claim 12, wherein exhausting at least the first portion of the oxygen rich gas from the pneumatic starter to the combustion zone comprises exhausting the oxygen rich gas out at least one hole in the nosecone.

\* \* \* \* \*